US 6,655,692 B2

(12) United States Patent
Kono (10) Patent No.: US 6,655,692 B2
(45) Date of Patent: Dec. 2, 2003

(54) BRUSH SEAL DEVICE

(75) Inventor: Toru Kono, Sakado (JP)

(73) Assignee: Eagle Engineering Aerospace Co., LTD, Tokyo (JP)

( * ) Notice: Subject to any disclaimer, the term of this patent is extended or adjusted under 35 U.S.C. 154(b) by 0 days.

(21) Appl. No.: 09/991,637

(22) Filed: Nov. 26, 2001

(65) Prior Publication Data

US 2002/0063391 A1 May 30, 2002

(30) Foreign Application Priority Data

Nov. 27, 2000 (JP) ........................................ 2000-359129

(51) Int. Cl.[7] ................................................. F16J 15/44
(52) U.S. Cl. ........................................................... 277/355
(58) Field of Search ................................. 277/355, 345; 415/110–113, 174.2, 170.1

(56) References Cited

U.S. PATENT DOCUMENTS 5,174,582 A * 12/1992 Ferguson .................... 277/355
5,568,931 A * 10/1996 Tseng et al. ................. 277/355
5,799,952 A * 9/1998 Morrison et al. ............ 277/355
6,267,381 B1 * 7/2001 Wright ........................ 277/355

FOREIGN PATENT DOCUMENTS

GB       2258277 A   *  2/1993   ............. F16J/15/32

* cited by examiner

Primary Examiner—Anthony Knight
Assistant Examiner—Lisa Bannapradist
(74) Attorney, Agent, or Firm—Arent Fox Kintner Plotkin & Kahn, PLLC (57) ABSTRACT

A brush seal device of the present invention has a holding portion and a brush having a plurality of bristles. The holding portion is held by one part and is in the shape of a sealing plate. One end portion of the brush is connected with the holding portion. A free end portion of the brush is disposed in parallel with the holding portion and protrudes therefrom so as to seal a gap between itself and the other part to which the brush is opposed. An elastic portion holds the side of the free end portion of the brush in light touch with a holding surface of the holding portion. The elastic portion also performs a sealing function so as to prevent sealed fluid from entering the side of the mounting portion of the brush.

5 Claims, 7 Drawing Sheets

BRUSH SEAL DEVICE

FIELD OF THE INVENTION

The present invention relates to a brush seal device having a brush for sealing a gap between two parts that move relative to each other (that make rotational movements, reciprocating movements, or the like). More particularly, the present invention relates to a brush seal device for sealing a gap between two parts which are opposed to each other and one of which is movable.

BACKGROUND OF THE INVENTION

There are various types of sealing devices for sealing a gap between two parts that move relative to each other (that make rotational movements, reciprocating movements, or the like). For example, a brush seal device as shown in FIG. 9 is based on a generally known art.

Figure 9:
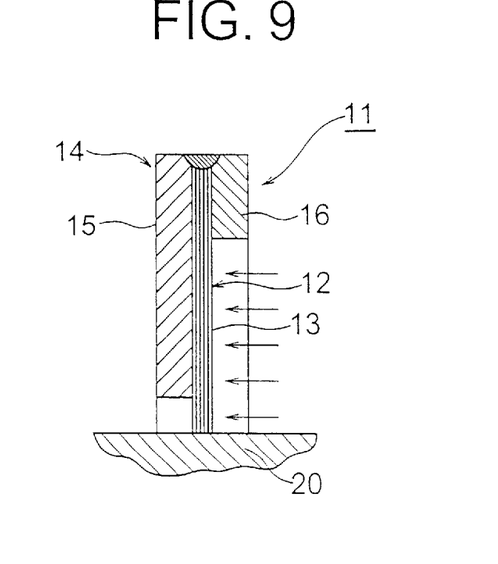
FIG. 9 is a sectional view of a brush seal device according to a conventional example.

Referring to FIG. 9, a brush seal 11 is composed of a brush 12 and a holding portion 14. The brush 12 is formed of thin bristles 13 made from a highly rigid material such as metal, synthetic resin, ceramics, composite material, or the like. The thin bristles 13 are disposed in a wall shape with a certain thickness. The holding portion 14 is composed of a back plate 15 and a side plate 16, which hold and clamp the brush 12 therebetween.

Figure 10:
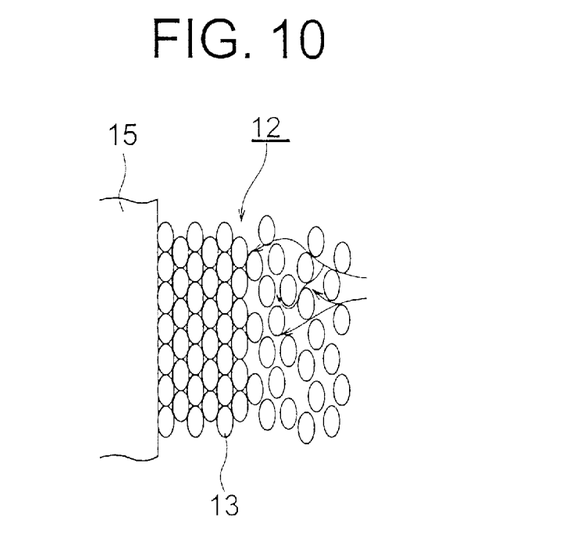
FIG. 10 is a plan view of the brush seal device shown in FIG. 9 when viewed from its inner diameter side.

The holding portion 14 of the brush seal 11 is secured to one (a fixed body not shown in the drawing) of two parts that move relative to each other (e.g. that make rotational movements), and a free end of the brush 12 is in contact with the other part 20 (a rotor). Alternatively, the free end of the brush 12 is contiguous to the other part 20 and spaced apart therefrom by a narrow gap, whereby the gap between the two parts that move relative to each other is sealed (see FIGS. 9 to 11).

If the other part 20 is off-centered due to its rotation or is deformed due to a rotational force or if the gap between one part (the fixed body) and the other part 20 undergoes a change ascribable to a relative dimensional difference between the two parts as a result of a difference in thermal expansion coefficient therebetween, the entire brush 12 escapes while deflecting radially in accordance with the movement of the other part 20. It is thus possible to prevent the free end portion of the brush 12 from wearing down and prevent the amount of leakage of sealed fluid from increasing.

Figure 12:
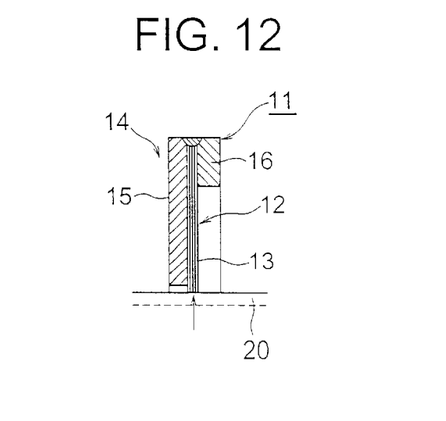
FIG. 12 is a sectional view for illustrating an operational state of the brush seal device, that is, a state in which the rotor is in press-contact with the brush when the other part is rotationally off-centered or is deformed due to its rotation or when the dimension of a gap between the two parts changes in response to a change in temperature resulting from a difference in thermal expansion coefficient between the two parts.
Figure 13:
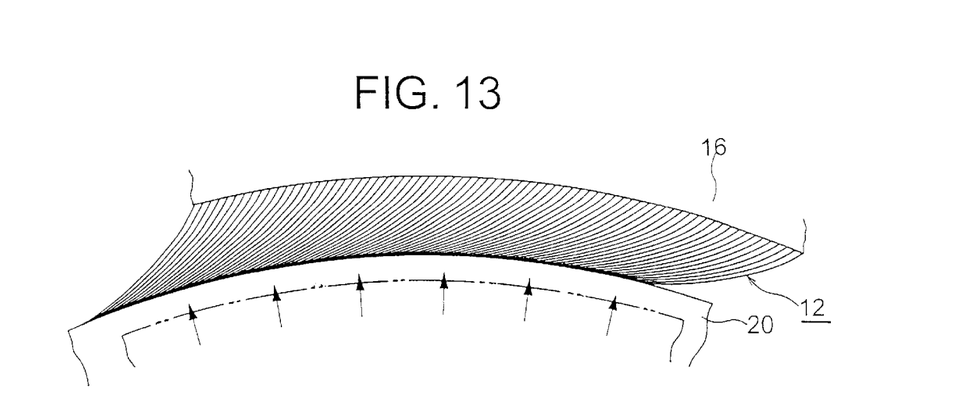
FIG. 13 is a partial front view for illustrating the operational state of the brush seal device shown in FIG. 12.
Figure 14:
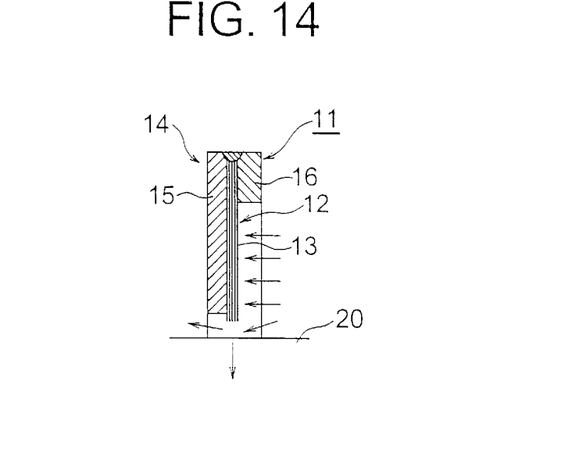
FIG. 14 is a sectional view for illustrating an operational state of the brush seal device, that is, a state in which the rotor is spaced apart from the brush when the other part is rotationally off-centered or is deformed due to its rotation or when the dimension of a gap between the two parts changes in response to a change in temperature resulting from a difference in thermal expansion coefficient between the two parts.
Figure 15:
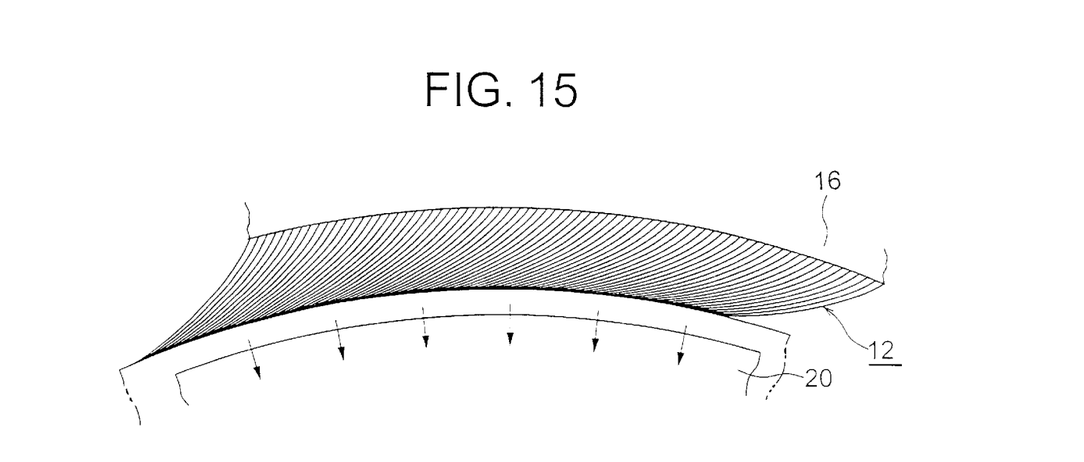
FIG. 15 is a partial front view of the brush seal device shown in FIG. 14.

In the brush seal device 11 constructed as described above, however, the brush 12 is pressed hard against the back plate 15 due to a differential pressure between upstream and downstream pressures. Therefore, if the other part 20 is off-centered during rotation or is deformed due to its rotation or if the gap between one part (the fixed body) and the other part 20 undergoes a change ascribable to a relative dimensional difference between the two parts as a result of a difference in thermal expansion coefficient therebetween, a frictional resistance between the brush 12 and the back plate 15 and a frictional resistance of the thin bristles 13 of the brush 12 prevent the brush 12 from deflecting radially and escaping. Hence, the free end portion of the brush 12 wears down (see FIGS. 12 and 13). Also, if the degree of deformation of the other part 20 resulting from its rotation or the degree of eccentricity of the other part 20 during its rotation becomes small, the brush 12 is held while deflecting toward the back plate 15 due to the frictional resistance between the brush 12 and the back plate 15 and the frictional resistance of the thin bristles 13 of the brush 12. Therefore, the brush 12 cannot return from its deflected state to its original state. Hence, the gap between the free end portion of the brush 12 and the other part 20 increases to the extent of causing leakage (see FIGS. 14 and 15). In addition, since the brush 12 is free in a region affected by sealed fluid, the spaces among the thin bristles 13 in the region constitute passages into which sealed fluid flows and from which sealed fluid leaks (see FIG. 10).

SUMMARY OF THE INVENTION

The present invention has been made as a solution to the conventional problems as described above. It is an object of the present invention to allow the brush to escape while deflecting radially in accordance with the movement of the other part if the other part is off-centered during its rotation or is deformed due to its rotation or if the gap between one part (the fixed body) and the other part undergoes a change ascribable to a relative dimensional difference between the two parts as a result of a difference in thermal expansion coefficient therebetween. It is also an object of the present invention to effectively prevent the free end portion of the brush from wearing down and to allow the brush to return smoothly from its deflected state to its original state if the degree of swell of the other part resulting from its deformation or the degree of eccentricity of the other part resulting from its rotation becomes small. Furthermore, it is also an object of the present invention to prevent the gap between a tip of the brush and the other part from increasing to the extent of causing leakage of sealed fluid. Still further, it is also an object of the present invention to prevent sealed fluid from entering the spaces among the thin bristles of the brush, and thus, to effectively prevent the free end portion of the brush from wearing down by being pressed against the other part due to a pressure of sealed fluid entering those spaces.

The brush seal device of the present invention has a brush and a holding portion. The brush has a plurality of bristles disposed in a mural manner. The holding portion holds one end side of the brush. The holding portion is secured to one of two parts that move relative to each other, and a free end portion of the brush is disposed in contact with or contiguous to the other part. An elastically deformable elastic portion for sealing is provided between opposed faces of the holding portion and the brush. The brush is pressed toward the holding portion due to an elastic force of the elastic portion so that the gap between the brush and the holding portion is sealed. Thus, sealed fluid is prevented from entering the gap between the brush and the holding portion.

Because the brush seal device of the present invention is based on the aspect as described above, the brush is pressed against the face of the holding portion which is opposed to the brush due to the elastic force of the elastic portion, so that the bristles of the brush are in close contact with one another. As a result of such close contact of the bristles, sealed fluid can be prevented from entering spaces among the bristles. Therefore, the brush can deflect in accordance with the movement of the other part without being immobilized by a pressure of sealed fluid entering those spaces. In addition, the brush can return quickly from its deflected state to its original state.

Still further, since the elastic portion for sealing seals the gap between the brush and the holding portion, it is possible to prevent sealed fluid from entering the gap between the brush and the holding portion and to prevent the brush from being exposed to a differential pressure between upstream and downstream pressures. As a result, the brush is not immobilized by being pressed against the holding portion due to such a differential pressure. Thus, it becomes easier for the brush to deflect in accordance with the movement of the other part or even to return from its deflected state to its original state.

DETAILED DESCRIPTION OF PREFERRED EMBODIMENTS

Figure 1:
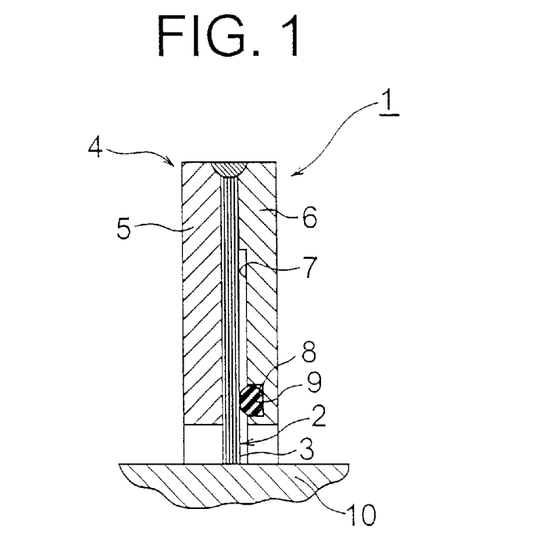
FIG. 1 is a sectional view of a brush seal device according to a preferred embodiment of the present invention.
Figure 2:
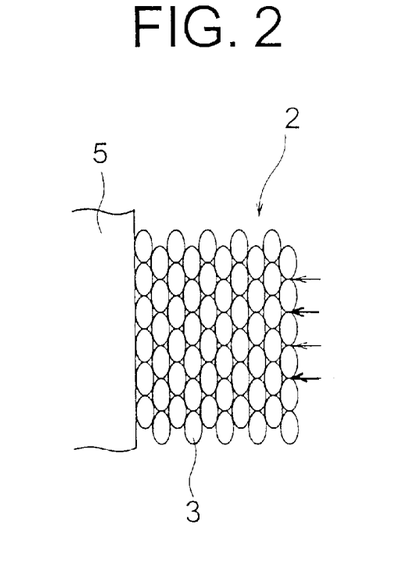
FIG. 2 is a plan view of the brush seal device shown in FIG. 1 when viewed from its inner diameter side.

FIG. 1 is a sectional view of a brush seal device according to a preferred embodiment of the present invention, showing a state in which the brush seal device is fitted to the other part (rotor). FIG. 2 is a plan view of a brush and a holding portion when viewed from the inside diameter side of the brush seal device shown in FIG. 1.

Referring to FIG. 1, the brush seal device is denoted by reference numeral 1. The brush seal device 1 mainly includes a brush 2 formed by disposing bristles 3 in a wall shape with a certain thickness, a holding portion 4 for holding a fitting portion at one end of the brush 2, and an elastic portion 9 interposed between opposed faces of the brush 2 and the holding portion 4.

The bristles 3 of the brush 2 are made from a highly rigid material such as metal, synthetic resin, ceramic material, composite material, or the like. The bristles 3 are disposed in a wall shape with a certain thickness so that a gap to be sealed can be shut off.

Figure 11:
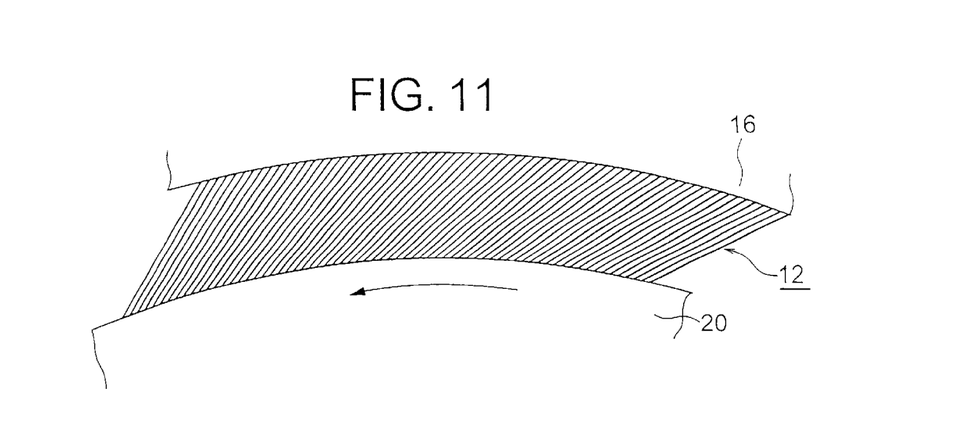
FIG. 11 is a partial front view for illustrating a state in which the brush seal device is fitted to a rotor normally.

The brush 2 is formed into a shape suited for a location to be sealed. As a whole, the brush 2 assumes an annular, semi-annular, or plate-like shape, etc. Because the location to be sealed in the first preferred embodiment is a gap between two parts that rotate relative to each other, the brush 2 is formed into an annular shape correspondingly. As shown in FIG. 11, the bristles 3 are inclined with respect to a radial direction. This inclination is directed in a direction in which the other part 20 (10) rotates as indicated by an arrow in FIG. 11.

The holding portion 4 is formed into a shape corresponding to the shape of the brush 2 and thus into an annular, semi-annular, or plate-like shape, etc. Because the location to be sealed in the first preferred embodiment is a gap between two parts that rotate relative to each other, the holding portion 4 is formed into an annular shape just like the brush 2.

The holding portion 4 is composed of an annular back plate 5 and an annular side plate 6, which is integrally attached to one side of the back plate 5 by a connecting means such as welding, bolts, or the like. In this case, the back plate 5 and the side plate 6 are substantially equal in inner diameter and outer diameter.

A step portion 7 designed to create a gap between the brush 2 and the side plate 6 is formed in the side plate 6 in its face opposed to the back plate 5, in such a manner as to form an annular space stretching along the entire circumference. A mounting groove 8 for mounting the elastic portion 9 is formed in an inner peripheral edge portion of the step portion 7 along its peripheral face. The mounting groove 8 is rectangular in cross-section. The elastic portion 9, which will be described later, is fitted into the mounting groove 8.

The brush 2 is held between the back plate 5 and the side plate 6. In this case, while one side of the brush 2 is joined with one side of the back plate 5, the brush 2 is clamped in its region relatively close to its outer diameter side between the back plate 5 and the side plate 6. Thus, the brush 2 is integrated with the back plate 5 and the side plate 6. An outer diameter end portion of the brush 2 is integrally connected with the outer peripheral portions of the back plate 5 and the side plate 6 by welding or the like. Furthermore, the inner peripheral face of the brush 2 is formed in such a manner as to protrude from the inner peripheral faces of the back plate 5 and the side plate 6, and is smaller in diameter than the inner peripheral faces of the back plate 5 and the side plate 6 by a preset length. The free end portion of the brush 2 thus protruding performs a sealing function.

The elastic portion 9 is a ring-like member having a generally circular cross-sectional shape and is made from an elastically deformable material such as rubber, synthetic resin, metal, or the like. Due to an elastic force of the elastic portion 9, the bristles 3 on the side of the free end portion of the brush 2 having the sealing function are in close contact with one another while being held toward the back plate 5. Also, the elastic portion 9 seals a gap between the brush 2 and the side plate 6 on its inner diameter side. In this construction, the surface roughness values of the opposed faces of the back plate 5 and the side plate 6 with which the brush 2 is in contact, the hardness of the elastic portion 9, and the pressing load of the elastic portion 9, and the like are set such that the brush 2 can move in response to abutment on the rotor.

The brush seal device 1 according to this preferred embodiment is designed such that the holding portion 4 is secured to one part (a housing that is not shown in the drawings for this embodiment) of two parts that move relative to each other and that the free end portion of the brush 2 is in contact with the other part 10 (the rotor in this embodiment). Alternatively, it is also possible to adjust the state of contact between the free end portion of the brush 2 and the other part 10 and thus to create a narrow gap between free end portions of the bristles 3 of the brush 2 and the other part 10. Then, the brush 2 seals the gap created between the two parts that move relative to each other.

Further, if the other part 10 is off-centered or deformed during its rotation or if the dimension of the gap between one part (the housing) and the other part 10 fluctuates due to a change in temperature resulting from a difference in thermal expansion coefficient between the two parts, the brush 2 is pressed against the other part 10 and thus is urged to deflect radially and escape.

In this case, the elastic portion 9 is interposed between the brush 2 and the side plate 6 and thus seals the gap therebetween. Hence, sealed fluid is prevented from entering the gap between the brush 2 and the side plate 6 and from exposing the brush 2 to a differential pressure, namely, a difference between upstream and downstream pressures. It is thus possible to prevent the brush 2 from being pressed hard against the back plate 5 due to such a differential pressure. As a result, even if the brush 2 abuts on the other part 10, it becomes possible for the brush 2 to escape while deflecting in accordance with the abutment. Therefore, the free end portion of the brush 2 can be prevented effectively from wearing down due to abutment on the other part 10.

Further, even in the case where the other part (rotor) 10 is off-centered during its rotation to a smaller extent or is deformed due to its rotational force to a smaller extent, since the elastic portion 9 is provided, the brush 2 is not exposed to a differential pressure between upstream and downstream pressures. Hence, the brush 2 is prevented from deflecting due to such a differential pressure when it is held by the back plate 5. Thus, the brush 2 is allowed to move freely without hindrance.

Thus, the brush 2 can return from its deflected state to its original state. Therefore, it is possible to effectively prevent the gap between the free end portion of the brush 2 and the other part 10 from increasing to the extent of increasing the amount of leakage of sealed fluid.

Furthermore, the brush 2 is held toward the back plate 5 due to an elastic force of the elastic portion 9 so that the bristles 3 are in close contact with one another. Therefore, sealed fluid does not enter the spaces among the bristles 3. Thus, the brush 2 can be prevented from being immobilized by being pressed hard against the other part 10 due to a pressure of sealed fluid entering those spaces.

Consequently, the brush 2 can deflect in accordance with the movement of the other part 10 or even return from its deflected state to its original state. Thus, the free end portion of the brush 2 can be prevented from wearing down.

FIGS. 3 to 8 show the brush seal device 1 according to other embodiments of the present invention.

Figure 3:
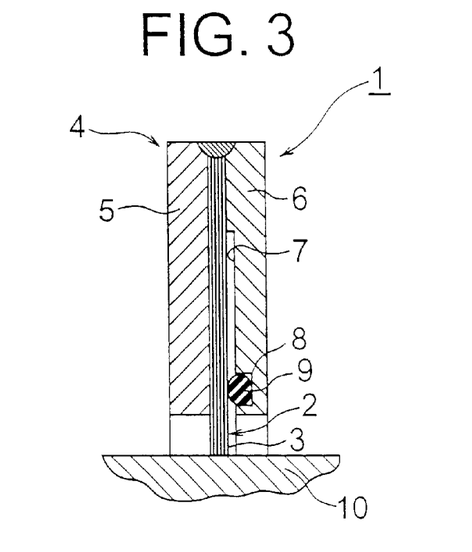
FIG. 3 is a sectional view of a brush seal device according to a second embodiment of the present invention.

FIG. 3 shows the second embodiment of the present invention. Referring to FIG. 3, the elastic portion 9 mounted in the mounting groove 8 is formed into a generally quadrate (rectangular) shape.

Figure 4:
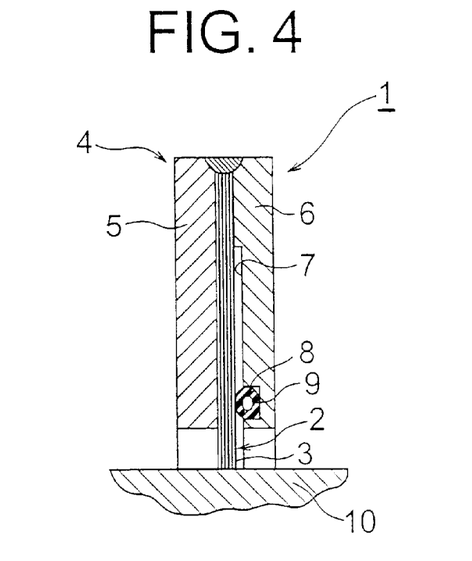
FIG. 4 is a sectional view of a brush seal device according to a third embodiment of the present invention.

FIG. 4 shows the third embodiment of the present invention. The elastic portion 9 mounted in the mounting groove 8 shown in FIG. 4 has a ring-like cross-sectional shape.

Figure 5:
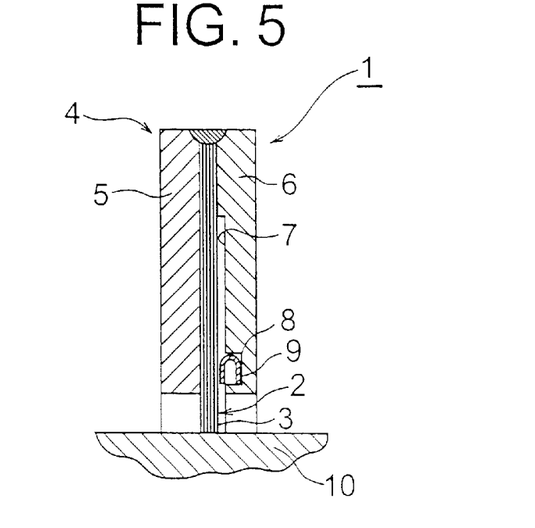
FIG. 5 is a sectional view of a brush seal device according to a fourth embodiment of the present invention.

FIG. 5 shows the fourth embodiment of the present invention. The elastic portion 9 mounted in the mounting groove 8 shown in FIG. 5 has a U-shaped cross-section.

Figure 6:
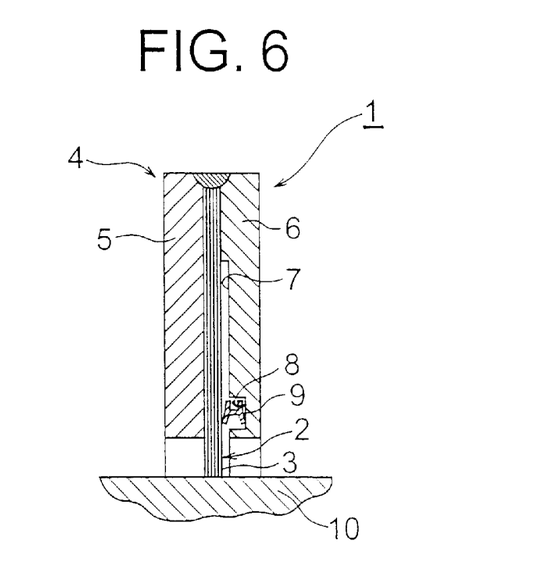
FIG. 6 is a sectional view of a brush seal device according to a fifth embodiment of the present invention.

FIG. 6 shows the fifth embodiment of the present invention. The elastic portion 9 mounted in the mounting groove 8 shown in FIG. 6 has an E-shaped cross-section.

Figure 7:
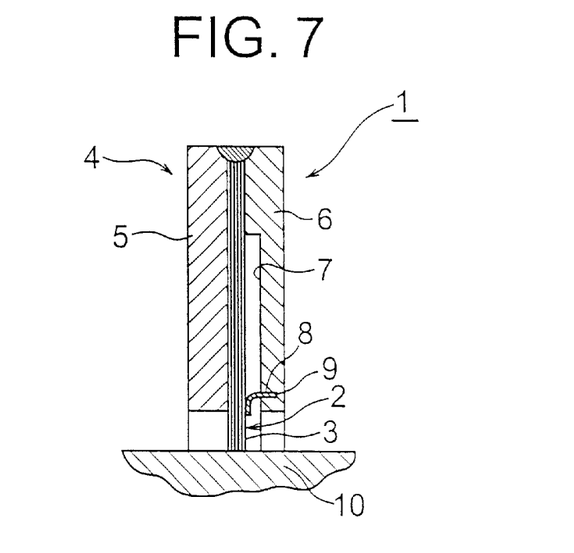
FIG. 7 is a sectional view of a brush seal device according to a sixth embodiment of the present invention.

FIG. 7 shows the sixth embodiment of the present invention. The elastic portion 9 mounted in the mounting groove 8 shown in FIG. 7 has an L-shaped cross-section. Further, the mounting groove 8 is formed into the shape of I. A mounting portion of the elastic portion 9 is press-fitted into and secured to the mounting groove 8, and a free end portion of the elastic portion 9 is joined with the brush 2 so that the back plate 5 holds the brush 2.

Figure 8:
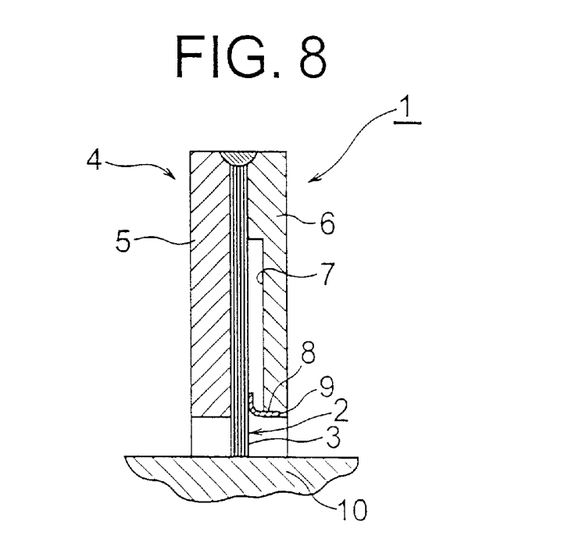
FIG. 8 is a sectional view of a brush seal device according to a seventh embodiment of the present invention.

FIG. 8 shows the seventh embodiment of the present invention. The elastic portion 9 mounted in the mounting groove 8 shown in FIG. 8 has an L-shaped cross-section. Further, the mounting groove 8 is formed in a stepped manner in an end face of the side plate 6. The mounting portion of the elastic portion 9 is fitted into and attached to the mounting groove 8, and the free end portion of the elastic portion 9 is joined with the brush 2 so that the brush 2 is joined with the back plate 5.

As in the case of the first embodiment, the second to seventh embodiments are also designed such that the elastic portion 9 is interposed between the brush 2 and the side plate 6 and thus seals the gap created therebetween. Therefore, sealed fluid is prevented from reaching the gap between the brush 2 and the side plate 6 and from directly exposing the brush 2 to a differential pressure, namely, a difference between upstream and downstream pressures. Hence, the brush 2 is prevented from being pressed hard against the back plate 5 due to the differential pressure to such an extent that the operation of the brush 2 corresponding to the abutment on the other part 10 is hindered. As a result, it becomes possible for the brush 2 to escape while deflecting radially in accordance with the movement of the other part 10, whereby the free end portion of the brush 2 is prevented from wearing down.

Even when the degree of deformation or eccentricity is small despite a rotational force applied from the other part 10, the brush 2 is not exposed to a differential pressure between upstream and downstream pressures. It is thus possible to prevent the back plate 5 from holding the brush 2 in its deflected state caused by the differential pressure. Even if the other part 10 abuts on the brush 2, the brush 2 can move without hindrance. Hence, the brush 2 can return quickly from its deflected state to its original state, whereby the amount of leakage of sealed fluid can be prevented effectively from increasing as a result of an increase in the gap between the free end portion of the brush 2 and the other part 10.

Furthermore, since the brush 2 is held by the back plate 5 due to an elastic force of the elastic portion 9 so that the bristles 3 are in close contact with one another, sealed fluid is prevented from entering the spaces among the bristles 3. The inconvenience of immobility of the brush 2, which would be caused if sealed fluid entered the spaces among the bristles 3 and pressed the brush 2 hard against the other part 10, can be prevented. Thus, the brush 2 can deflect in accordance with the movement of the other part 10 and, on the contrary, can return quickly from its deflected state to its original state. Therefore, the free end portion of the brush 2 can be prevented effectively from wearing down.

Although the elastic portion 9 has a circular, rectangular, ring-like, U-shaped, E-shaped, or L-shaped cross-section etc. in the embodiments described above, the cross-sectional shape of the elastic portion 9 should not be limited thereto. As long as the same operation and effect as described above can be achieved, the elastic portion 9 may assume any cross-sectional shape. It is to be noted herein that the elastic portion 9 has the functions of holding the bristles 3 in light touch with the back plate 5 and sealing the side of the mounting portion of the brush 2 between the back plate 5 and the side plate 6 so as to prevent entrance of sealed fluid.

Because the elastically deformable elastic portion 9 is disposed between the brush 2 and the holding portion 4 which are constructed as described above, the brush 2 can be held effectively by the holding portion 4 due to an elastic force of the elastic portion 9. The gap between the brush 2 and the holding portion 4 is sealed so as to prevent sealed fluid from entering the gap between the brush 2 and the holding portion 4, whereby it becomes possible to prevent the brush 2 from being exposed to a differential pressure between upstream and downstream pressures. Hence, the inconvenience of immobility of the brush 2, which would be caused if the brush 2 were pressed hard against the holding portion 4 due to the differential pressure, can also be prevented effectively.

Thus, the brush 2 can deflect in accordance with the movement of the other part 10 or even return quickly from its deflected state. The free end portion of the brush 2, which is in press-contact with the other part 10, can be prevented effectively from wearing down.

Furthermore, since the gap between the brush 2 and the other part 10 does not increase, the leakage of sealed fluid can be prevented effectively. Further, since the brush 2 is held by the elastic portion 9 so that the bristles 3 are in close contact with one another, there is no flow passage into which sealed fluid flows and from which sealed fluid leaks created among the bristles 3. Thus, the effect of sealing sealed fluid is achieved.

In addition, since the brush 2 can deflect in accordance with the movement of the other part 10 and can return quickly from its deflected state to its original state, the free end portion of the brush 2 can be prevented effectively from wearing down.

It is to be noted that the preferred embodiments of the present invention that have been described above are nothing but examples for explanation and that the present invention is not to be limited to the aspects disclosed herein. It is obvious to those skilled in the art that the aforementioned embodiments can be modified in many different ways. In other words, the technical scope of the present invention is defined by the claims.

What is claimed is:

1. A brush seal device comprising:
   a holding portion of which one end portion is held by one of two parts that move relative to each other and of which the other end portion is opposed to and spaced from the other part;
   a brush that is formed of a plurality of bristles disposed in a mural manner and that has a mounting portion and a free end portion, the mounting portion being located on one end side of the brush in parallel with the holding portion and secured thereto and the free end portion protruding from the holding portion and being opposed to the other part;
   an elastic portion that holds the brush in parallel with the holding portion,
   and wherein:
      the holding portion has a back plate and a side plate that are disposed in parallel with each other,
      the brush is disposed between the back plate and the side plate,
      the brush is held on the side of its free end portion by the back plate due to the elastic portion attached to the side plate,
      the elastic portion has an annular shape in order to seal between the brush and the side plate, and
      the elastic portion is made from an elastic material and formed into one of an O-ring shape and a hollow cross-sectional area shape.

2. The brush seal device according to claim 1, wherein the elastic portion presses the brush onto the back plate and the elastic portion can seal between the brush and the side plate.

3. The brush seal device according to claim 1, wherein The side plate has, on its side opposed to the brush, a step portion creating a space between the side plate and the brush.

4. A brush seal device comprising:
   a holding portion of which one end portion is held by one of two parts that move relative to each other and of which the other end portion is opposed to and spaced from the other part;
   a brush that is formed of a plurality of bristles disposed in a mural manner and that has a mounting portion and a free end portion, the mounting portion being located on one end side of the brush in parallel with the holding portion and secured thereto and the free end portion protruding from the holding portion and being opposed to the other part;
   an elastic portion that holds the brush in parallel with the holding portion,
   and wherein:
      the holding portion has a back plate and a side plate that are disposed in parallel with each other,
      the brush is disposed between the back plate and the side plate,
      the brush is held on the side of its free portion by the back plate due to the elastic portion attached to the side plate, and
      the elastic portion is made from an elastic material and formed into the shape of an O-ring.

5. A brush seal device comprising:
   a holding portion of which one end portion is held by one of two parts that move relative to each other and of which the other end portion is opposed to and spaced from the other part;
   a brush that is formed of a plurality of bristles disposed in a mural manner and that has a mounting portion and a free end portion, the mounting portion being located on one end side of the brush in parallel with the holding portion and secured thereto and the free end portion protruding from the holding portion and being opposed to the other part;
   an elastic portion that holds the brush in parallel with the holding portion,
   and wherein:
      the holding portion has a back plate and a side plate that are disposed in parallel with each other,
      the brush is disposed between the back plate and the side plate,
      the brush is held on the side of its free portion by the back plate due to the elastic portion attached to the side plate,
      the side plate has, on its side opposed to the brush, a step portion creating a space between the side plate and the brush, and
      the brush is held by the elastic portion that is made from an elastic material having a hollow cross-sectional area.

* * * * *